(12) United States Patent
Zentner et al.

(10) Patent No.: US 9,510,023 B2
(45) Date of Patent: Nov. 29, 2016

(54) MID-GOP FAST CHANNEL-CHANGE

(71) Applicant: Cisco Technology Inc., San Jose, CA (US)

(72) Inventors: Ariel Zentner, Hevel Yericho (IL); Yair Mirsky, Jerusalem (IL); Netanel Lipschuetz, Jerusalem (IL); Len Sundy, Ramat Beit Shemesh (IL); Keren Tal, Ramat Gan (IL)

(73) Assignee: Cisco Technology, Inc., San Jose, CA (US)

( * ) Notice: Subject to any disclaimer, the term of this patent is extended or adjusted under 35 U.S.C. 154(b) by 525 days.

(21) Appl. No.: 14/016,658

(22) Filed: Sep. 3, 2013

(65) Prior Publication Data

US 2014/0132843 A1    May 15, 2014

(51) Int. Cl.
| | |
|---|---|
| *H04N 7/12* | (2006.01) |
| *H04N 21/231* | (2011.01) |
| *H04N 21/438* | (2011.01) |
| *H04N 21/658* | (2011.01) |
| *H04N 21/222* | (2011.01) |

(52) U.S. Cl.
CPC ........ *H04N 21/231* (2013.01); *H04N 21/4384* (2013.01); *H04N 21/6581* (2013.01); *H04N 21/222* (2013.01)

(58) Field of Classification Search
CPC ........... H04N 21/4384; H04N 21/231; H04N 21/222
USPC ..................................... 375/240.25
See application file for complete search history.

(56) References Cited

U.S. PATENT DOCUMENTS

| | | |
|---|---|---|
| 7,562,375 B2 | 7/2009 | Barrett et al. |
| 7,830,908 B2 | 11/2010 | Akgul et al. |
| 2004/0223736 A1 | 11/2004 | Lin et al. |
| 2005/0207449 A1 | 9/2005 | Zhang et al. |
| 2006/0020995 A1 | 1/2006 | Opie et al. |
| 2006/0083263 A1 | 4/2006 | Jagadeesan et al. |
| 2007/0019675 A1 | 1/2007 | Weber |
| 2007/0174880 A1* | 7/2007 | Fite .................. H04N 21/23424 725/87 |
| 2007/0248165 A1 | 10/2007 | Boyce et al. |
| 2009/0138931 A1 | 5/2009 | Lin et al. |
| 2010/0111197 A1 | 5/2010 | Jiang et al. |

OTHER PUBLICATIONS

Rajesh, "Advantages of a Server over a Desktop Computer" pub. Mar. 16, 2012, available at http://www.excitingip.com/2862/advantages-of-a-server-over-a-desktop-computer-why-is-a-server-required/.*

May 21, 2013 Office Communication in connection with prosecution of GB 1220262.8.

* cited by examiner

*Primary Examiner* — Gims Philippe
*Assistant Examiner* — Benjamin Pezzner
(74) *Attorney, Agent, or Firm* — Samuel M. Katz

(57) ABSTRACT

A system comprising a decoder to receive an encoded video stream including video frames including reference and non-reference frames, and decode the reference frames, a processor to receive a request from an end-user rendering device requiring a first reference frame as part of decoding the encoded video stream of the first channel from the middle of a group of pictures of the encoded video stream, wherein a second reference frame is a reference frame for the first reference frame in the received encoded video stream, an encoder to encode the decoded first reference frame yielding a re-encoded first reference frame so that decoding the re-encoded first reference frame is not dependent upon the second reference frame, and a transmitter to transmit the re-encoded first reference frame to the end-user rendering device. Related apparatus and methods are also described.

20 Claims, 11 Drawing Sheets

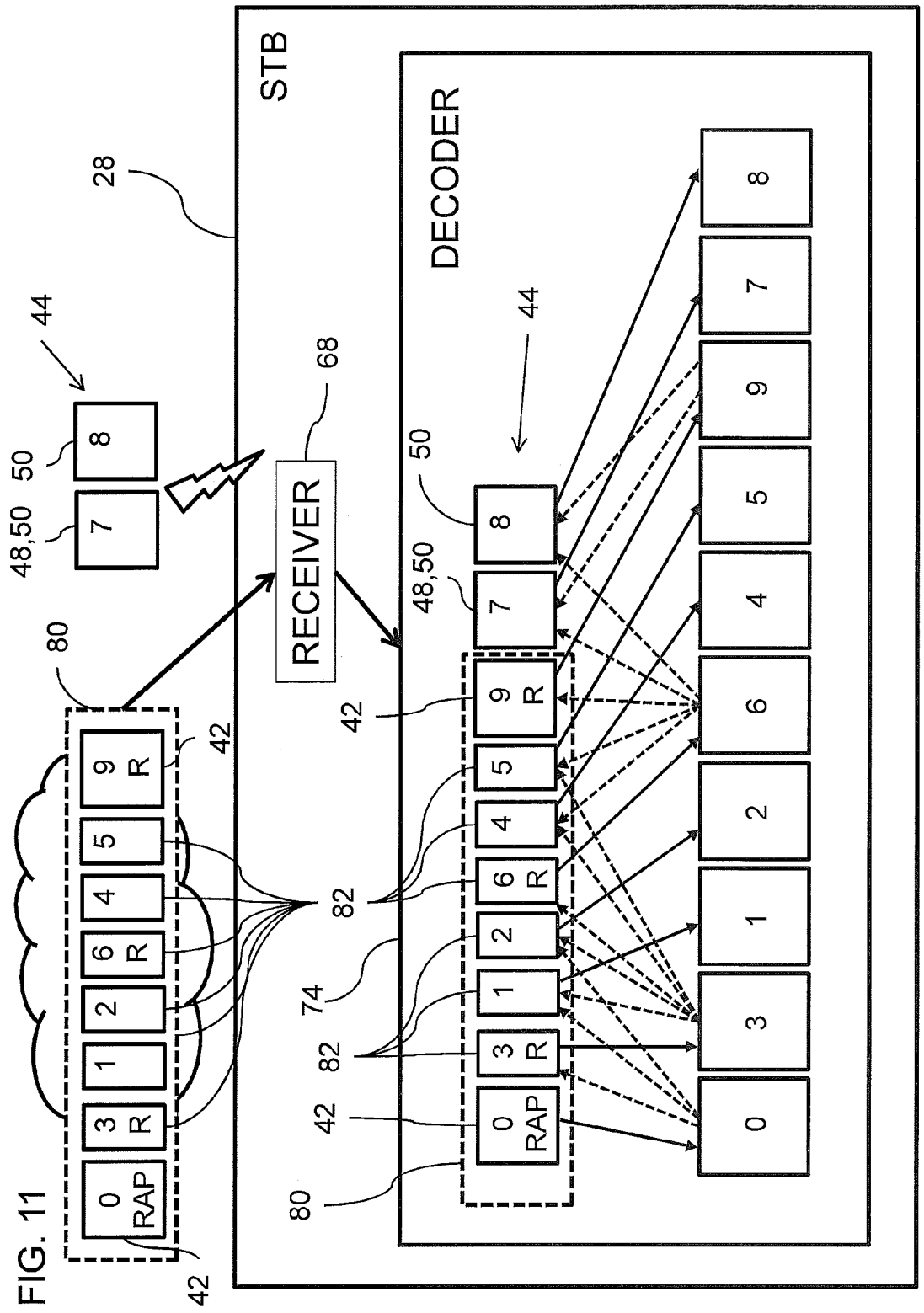

MID-GOP FAST CHANNEL-CHANGE

FIELD OF THE INVENTION

The present invention relates to fast channel change, and in particular, to fast channel change in to the middle of a group of pictures.

BACKGROUND OF THE INVENTION

The following references are believed to represent the state of the art:

U.S. Pat. No. 7,562,375 to Barrett, et al.;
U.S. Pat. No. 7,830,908 to Akgul, et al.;
US Published Patent Application 2004/223736 of Lin, et al.;
US Published Patent Application 2006/0020995 of Opie, et al.;
US Published Patent Application 2006/0083263 of Jagadeesan, et al.;
US Published Patent Application 2007/0019675 of Weber;
US Published Patent Application 2007/0248165 of Boyce, et al.; and
US Published Patent Application 2010/0111197 of Jiang, et al.

BRIEF DESCRIPTION OF THE DRAWINGS

The present invention will be understood and appreciated more fully from the following detailed description, taken in conjunction with the drawings in which:

FIG. 11 is a partly pictorial, partly block diagram view of the rendering device of FIG. 9 processing the second channel change operation in accordance with an alternative method.

DETAILED DESCRIPTION OF AN EMBODIMENT

Figure 1:
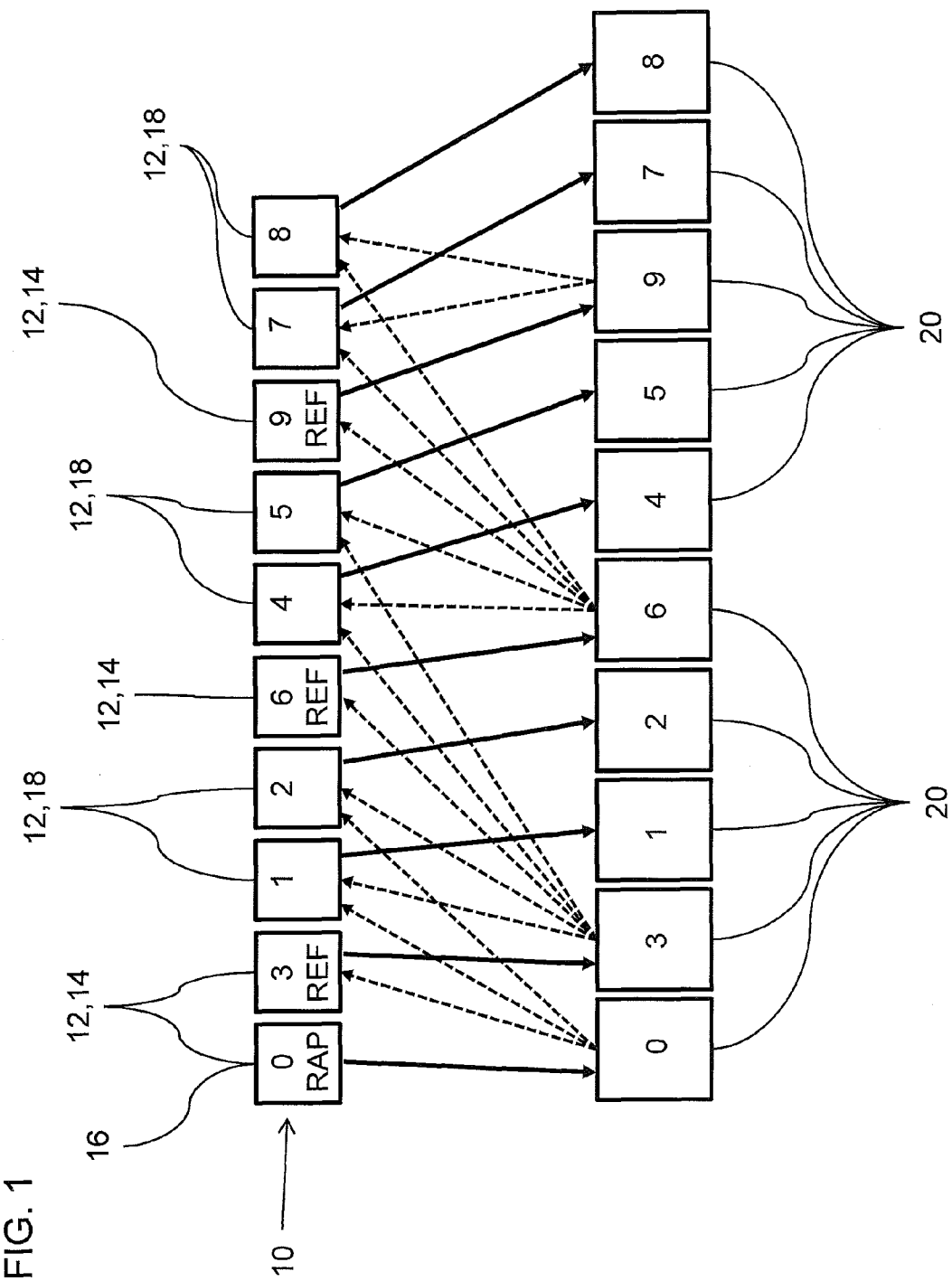
FIG. 1 is a partly pictorial, partly block diagram view of a group of pictures being decoded.

By way of introduction, when an end-user rendering device which is receiving a particular TV channel processes a channel change to another TV channel, the newly selected TV channel can only typically be decoded from the start of the next received random access point in the newly selected TV channel. Therefore, the occurrence of random access points may have a significant effect on channel change time so much so that broadcasters generally try to keep group of pictures (GOPs) as short as possible (usually around 0.5 seconds long) so as not to adversely impact channel change time. Compression of the video is generally more efficient as the GOP size increases. Therefore, using short GOPs does not generally result in an efficient video compression. However, using longer GOPs typically results in longer channel change times as stated above. Therefore, more efficient compression is generally sacrificed for quicker channel change times.

The present invention, in embodiments thereof, includes a system which enables having both a short channel change time and a large GOP size resulting in lower bandwidth requirements as will now be described in more detail below.

Some terminology used in the specification and claims is now defined.

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, HEVC encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example: encoded, but neither scrambled nor encrypted; compressed, but neither scrambled nor encrypted; scrambled or encrypted, but not encoded; scrambled or encrypted, but not compressed; encoded, and scrambled or encrypted; or compressed, and scrambled or encrypted.

Likewise, the terms "decoded" and "decompressed" on the one hand, and the terms "descrambled" and "decrypted" on the other hand, are used to refer to different and exclusive types of processing.

The term "reference frame", as used in the specification and claims, is defined as follows. If the decoding of a first video frame is at least partially dependent on video data of a second, now decompressed, video frame, then the second video frame is a reference frame of the first video frame. In older video encoding standards, such as MPEG-2, only one reference frame was used for P-frames and two reference frames were used for B-frames. Some modern video encoding standards, such as H.264/AVC and HEVC, allow the use of multiple reference frames. This allows the video encoder to choose among more than one previously decoded frame on which to base each macroblock in the next frame. While the best frame for this purpose is usually the previous frame, the extra reference frames can improve compression efficiency and/or video quality. Note that different reference frames can be chosen for different macroblocks in the same frame. By way of example, the maximum number of concurrent reference frames supported by H.264 is 16. Another video format that supports multiple reference frames is Snow, which can handle up to eight reference frames. The Theora codec provides a limited form of multiple reference frames, allowing references to both the preceding frame and the most recent intra frame.

Reference is now made to FIG. 1, which is a partly pictorial, partly block diagram view of a group of pictures 10 being decoded.

The group of pictures 10 described with reference to FIG. 1 is an example of a closed GOP, structured according to the MPEG-2 standard.

The group of pictures 10 includes a plurality of encoded video frames 12. Some of the encoded video frames 12 are reference frames 14 and some of the encoded video frames 12 are non-reference frames 18. The group of pictures (GOP) 10 typically also includes a random access point 16. A random access point, as used in the specification and claims, is defined as a frame in a video sequence from which decoding can commence without first requiring the decoding of another frame in the video sequence. A group of pictures, as used in the specification and claims, is defined as including video frames, starting at one random access point and concluding just before the next random access point.

FIG. 1 shows solid lines and dashed lines. The solid lines show the process of decoding of an encoded video frame 12 to a decoded video frame 20. The dashed lines show which of the encoded frames 12 are dependent on which of the decoded video frames 20 for decoding purposes. For example, encoded frame 3 is dependent on decoded frame 0 for decoding purposes and encoded frame 6 is dependent on decoded frame 3 for decoding purposes.

Each of the video frames 12, 20 of the group of pictures 10 has a temporal reference, shown by numerals 0 to 9 inside the boxes of FIG. 1. The temporal references start at zero and increment by one so that each of the video frames 12, 20 has a different temporal reference. The temporal references thereby give the video frames 12, 20 a temporal order. The temporal reference is used to determine the order in which the video frames 20 will be displayed.

The term "temporal reference" is typically used with reference to the MPEG-2 specification. The term "temporal reference" as used in the present specification and claims is defined to include descriptors equivalent to "temporal reference" used in other suitable encoding standards.

The encoded video frames 12 are shown in FIG. 1 in the order that the frames 12 will be transmitted and decoded. The reason that the decoding order is different from the display order is due to certain frames 12 being bidirectional dependent such that a particular frame 12 may depend on a previous frame 20 and a future frame 20 (in temporal order). For example, encoded frame 1 is dependent on decoded frame 0 and decoded frame 3 for decoding purposes. It will be appreciated that in an H.264/AVC implementation for example, bidirectional dependence may be to multiple frames.

By way of example only, MPEG-2 structure is generally designed in such a way that decoding from the beginning of the GOP is typically required to decode a frame in the middle of that GOP. During the decoding stage non-reference frames are discarded once displayed while reference frames are kept as long as they are required as a reference for the decoding of future frames. For example in MPEG-2 video, at most two reference frames are required in order to decode any other frame in the GOP (no reference frames are required to decode an I frame, one reference frame is required for a P frame and two for a B frame).

The term "middle of the GOP", as used in the specification and claims, is defined as any point in the GOP after, but not including, the random access point of the beginning of the GOP.

Based on the above, it will be appreciated that when an end-user rendering device which is receiving a particular TV channel processes a channel change to another TV channel, the newly selected TV channel can only typically be decoded from the start of the next received random access point in the newly selected TV channel. Therefore, the occurrence of random access points may have a significant effect on channel change time so much so that broadcasters generally try to keep GOPs as short as possible (usually around 0.5 seconds long) so as not to adversely impact channel change time. The above discussion is not limited to MPEG-2 but will also apply to other encoding standards for example, but not limited to, H.264/AVC, HEVC, VC-1 and VP8, Snow and Theora.

Compression of the video is generally more efficient as the GOP size increases. Therefore, using short GOPs does not generally result in an efficient video compression. However, using longer GOPs typically results in longer channel change times as stated above. Therefore, more efficient compression is generally sacrificed for quicker channel change times.

Some channel change systems reduce the channel change time, by caching video data in an IP server and sending the cached data in a burst to the requesting end-user rendering device when required for channel change. A high peaked data burst is thereby created during the channel change resulting in the end-user rendering device lagging behind the live stream by at least one GOP time period.

The present invention, in embodiments thereof, includes a system which enables having both a short channel change time and a large GOP size resulting in lower bandwidth requirements as will now be described in more detail with reference to FIGS. 2-11.

Figure 2:
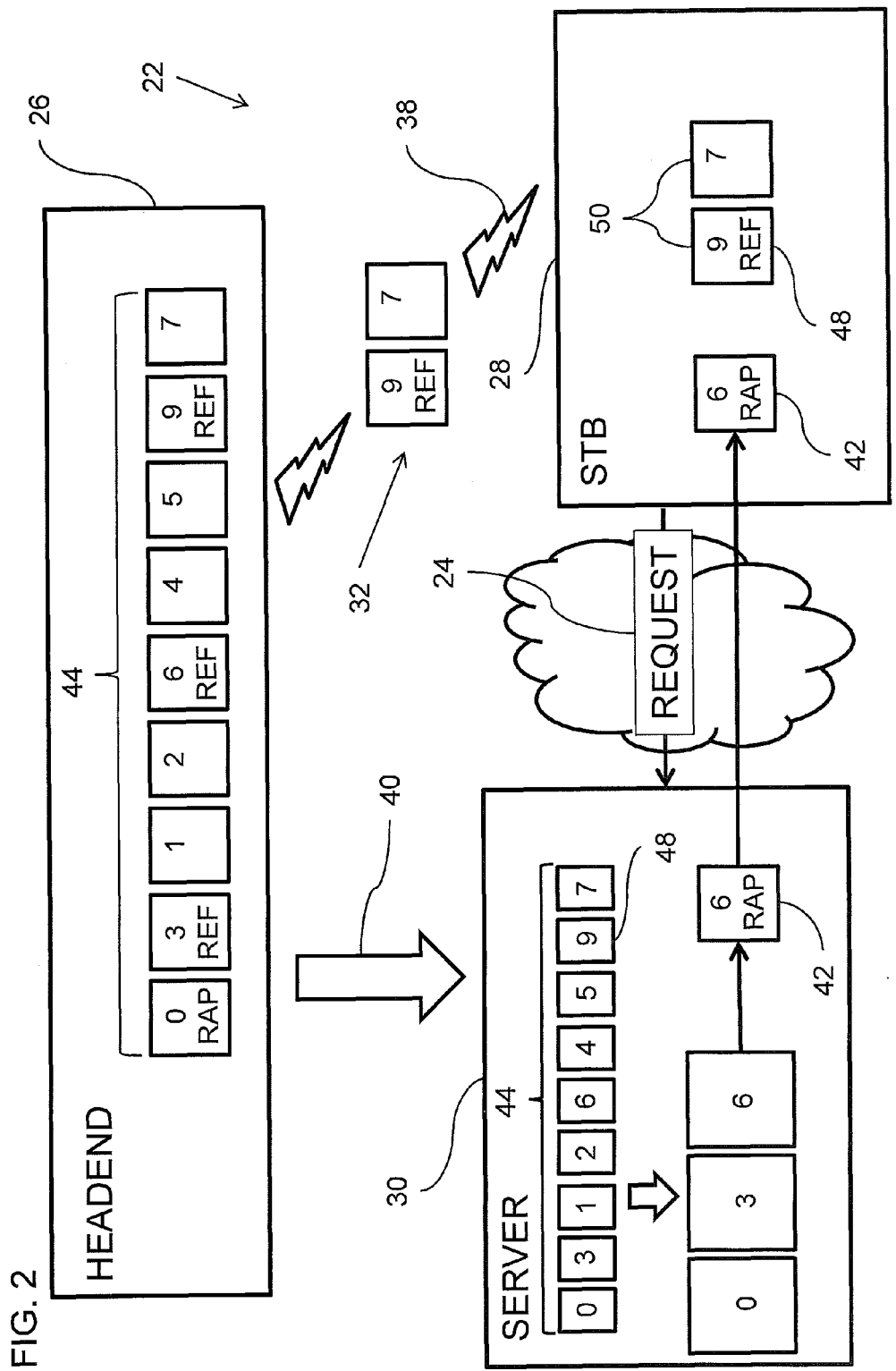
FIG. 2 is a partly pictorial, partly block diagram view of a content delivery system processing a request related to a first channel change operation, the content delivery system being constructed and operative in accordance with an embodiment of the present invention.

Reference is now made to FIG. 2, which is a partly pictorial, partly block diagram view of a content delivery system 22 processing a request 24 related to a first channel change operation constructed and operative in accordance with an embodiment of the present invention.

The content delivery system 22 includes a Content server 26 (for example, a broadcast Headend), a plurality of end-user rendering devices 28 (only one shown for the sake of clarity) and one or more servers 30 (only one shown for the sake of clarity). The end-user rendering devices 28 are external to the servers 30 and the content server 26. The content server 26 streams content in one or more streams 32 to the end-user rendering devices 28 via any suitable content delivery medium 38, for example, but not limited to, satellite, cable, IP, terrestrial or mobile network. Each stream 32 may include the data of one or more TV channels. The content server 26 also transmits the content to the servers 30 via any suitable content delivery medium 40, for example, but not limited to, satellite, cable, IP, terrestrial or mobile network.

For the sake of simplicity the description below is generally described with reference to one server 30 and one end-user rendering device 28. However, it will be appreciated that each server 30 typically serves a group of the end-user rendering device 28. The groups may be fixed or may be dynamically changed based on loading requirements.

FIG. 2 shows one of the end-user rendering devices 28 after selecting a new TV channel. The end-user rendering device 28 is receiving a plurality of frames 50 (reference frame 9 and non-reference frame 7) of a GOP 44 of the newly selected channel from the content server 26. Reference frame 9, which is in the middle of the GOP 44, is a first frame 48 received by the end-user rendering device 28 for the newly selected channel. The GOP 44 cannot be decoded from the first frame 48 as reference frame 9 is dependent upon decoded reference frame 6 for decoding purposes.

The server 30 enables the end-user rendering device 28 to start rendering the new channel in the midst of the GOP 44 without first waiting for a random access point in the stream 32 to be received from the content server 26. Since the end-user rendering device 28 can start rendering the video of the new channel in the middle of the GOP 44, the Broadcaster can use large GOP sizes thereby saving bandwidth and at the same time maintaining a reasonably fast channel change time.

The end-user rendering device 28 generally prepares a request 24 related to the channel change and sends the request 24 to the server 30. Upon receiving the request 24, the server 30 typically generates and sends the end-user rendering device 28 the minimum amount of data required (the reference frame (s) 42) to start decoding from the first frame 48 in the middle of the GOP 44. In the case of FIG. 2, only one reference frame is required (namely, reference frame 6). The reference frame(s) 42 are typically sent via an IP network 36 from the server 30 to the requesting end-user rendering device 28. It should be noted that reference frame 6 was not a random access point in the original stream 32 sent from the content server 26. Additionally, in the original stream 32 sent from the content server 26, reference frame 6 depends on decoded reference frame 3 which in turn depends upon decoded reference frame 0 for decoding purposes. Therefore, instead of sending reference frames 0, 3 and 6 to the end-user rendering device 28, the servers 30 typically converts the reference frame 6 into a random access point as will be described in more detail with reference to FIG. 3.

Sending the re-encoded reference frame(s) 42 generally requires minimal network bandwidth compared with sending the whole GOP 44 up to that point or even sending the original reference frames 0, 3 and 6. Additionally, the end-user rendering device 28 will typically have less decoding to perform based on receiving the reference frame(s) 42 compared to decoding the whole GOP 44 up to that point or even compared to decoding the original reference frames 0, 3 and 6. Moreover, since the end-user rendering device 28 starts decoding from the middle of the GOP 44, rather than from the beginning of the GOP 44, the decoding generally does not lag far behind the live stream timing.

It will be appreciated that as the end-user rendering devices 28 can decode from any point inside the GOP 44, there is no practical limit to GOP size due to channel change requirements, thereby leading to bandwidth savings.

The content delivery system 22 is now described in more detail.

The server 30 typically continually buffers the latest video data of each TV channel (for example, but not limited to, one or two GOPs or more from each channel). The server 30 also continually decodes at least the reference frames of the buffered video. The server 30 generally waits for requests from the end-user rendering device(s) 28.

When the end-user rendering device 28 processes a channel change, the end-user rendering device 28 typically tunes to the stream 32 of the requested channel and starts generally buffering the data of the tuned stream 32. As soon as the end-user rendering device 28 identifies the first frame 48 received, which is most likely in the midst of the GOP 44, the end-user rendering device 28 typically sends the request 24 to the server 30 to supply the end-user rendering device 28 with the required reference frame(s) 42 to decode the GOP 44 from the first frame 48 and onwards. The request 24 typically includes a frame reference of the first frame 48 such as a PTS (presentation time stamp) or any other suitable way of identifying a frame (for example, but not limited to, a hash of the frame data).

Upon receiving the request 24, the server 30 typically locates the requested frame 48 in the cache (not shown) of the server 30. The server 30 generally then determines which reference frame(s) the first frame 48 relies on, for example, by building a dependency graph described in more detail with reference to FIG. 3. The server 30 then typically generates the reference frame(s) 42 which the first frame 48 requires for decoding purposes while generating at least one of the reference frame(s) 42 as a random access point. The server 30 generally then sends the reference frame(s) 42 to the end-user rendering device 28 with presentation time stamps (PTSs) and temporal references of the reference frame(s) 42 as necessary.

Alternatively, the end-user rendering device 28 sends the request 24 to the server 30 as soon as the end-user rendering device 28 begins the channel change process to change to a new channel, but prior to receiving the first frame 48 of the video of the new channel. Since the server 30 also receives the same live streams 32 as the end-user rendering device 28, the server 30 can typically estimate what is likely to be the first frame 48 that the end-user rendering device 28 will receive. In order to improve estimation by the server 30 of what is likely to be the first frame 48, the end-user rendering device 28 may send, in the request 24, a most recently received timestamp in the current (old) channel such as the most recently received program clock reference (PCR) or the current system clock value, so that the server 30 which is also receiving data for the old channel may find an equivalent time reference in the new channel and based on the equivalent time reference estimate which is the first frame 48. The server 30 can generally begin preparing the required reference frame(s) 42 for sending to the end-user rendering device 28.

In accordance with an embodiment of the present invention, the server 30 may automatically generate the reference frame(s) 42 on a continual basis (without receiving a request 24) so that when one of the end-user rendering devices 28 makes a request 24 for the generated reference frame(s) 42, the required reference frame(s) 42 are already generated and ready for transmission to the requesting end-user rendering device 28.

As the content delivery system 22 requires collaboration between the servers 30 and the end-user rendering devices 28, the physical location of the servers 30 and/or the communication infrastructure between the servers 30 and the end-user rendering devices 28 should be configured in order to minimize Internet Protocol (IP) latency between the servers 30 and their respective end-user rendering devices 28. By way of example, each server 30 may reside in a different CDN (Content Delivery Network) serving the end-user rendering devices 28.

The content delivery system 22 may be implemented with any suitable video encoding standard. It will be appreciated that the reference frame(s) 42 required by the end-user rendering device 28 to start decoding from the middle of the GOP 44 will typically depend on the video encoding standard being used. By way of example, in accordance with H.264/AVC at least one, and up to 16, reference frames may be required for decoding any one frame by the end-user rendering device 28.

The request 24 is typically sent from the end-user rendering device 28 to the server 30 via IP or cable communication or any suitable communication method or system. Similarly, the reference frame 42 is typically sent from the server 30 to the end-user rendering device 28 via IP or cable or any suitable communication method or system.

In the example of FIG. 2, the GOP 44 is a closed GOP. It will be appreciated by those ordinarily skilled in the art that the content delivery system 22 may be implemented with an open GOP. In a closed GOP, the frames of the GOP only reference frames in the same GOP. In an open GOP, at least one of the frames in the GOP reference at least one frame in another GOP.

Figure 3:
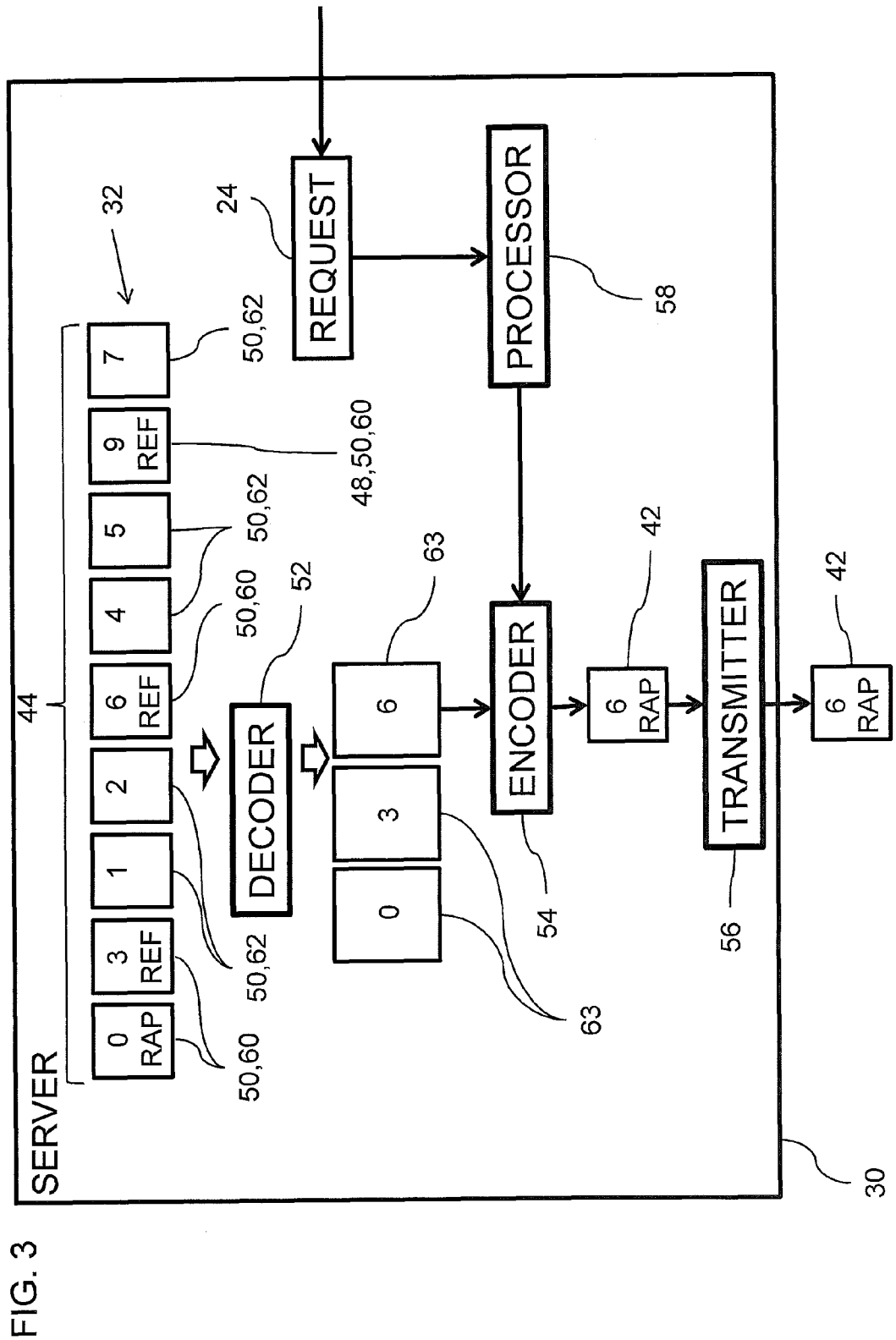
FIG. 3 is a partly pictorial, partly block diagram view of a server in the system of FIG. 2 processing the request.

Reference is now made to FIG. 3, which is a partly pictorial, partly block diagram view of the server 30 in the system 22 of FIG. 2 processing the request 24.

The server 30 typically includes one or more decoders 52, one or more encoders 54, one or more transmitters 56 and a processor 58.

The server 30 may also include one or more demultiplexers to demultiplex the streams 32 (FIG. 2) received from the content server 26 (FIG. 2) depending on how the streams 32 are transmitted to the servers 30.

The number of the decoders 52, encoders 54 and transmitters 56 will typically also depend upon the number of streams 32, how many channels are included in each stream 32 and how many end-user rendering devices 28 are served by each server 30. However, for the sake of simplicity the operation of the server 30 is now described with reference to one decoder 52, one encoder 54 and one transmitter 56.

The decoder 52 is typically operative to receive the encoded video stream 32 for a selected channel. The encoded video stream 32 includes video frames 50 including a plurality of reference frames 60 and a plurality of non-reference frames 62. The decoder 52 is typically operative to decode the reference frames 60 of the received encoded video stream 32 for the channel, yielding decoded reference frames 63. The decoder 52 may decode all the frames 50 of the stream 32. However, the decoder 52 only typically has to decode the reference frames 60.

The processor 58 is typically operative to receive the request 24 from the end-user rendering device 28 (FIG. 2). The request 24 typically relates to the end-user rendering device 28 changing channels to the selected channel in the middle of the GOP 44 of the encoded video stream 32 of the selected channel. The request 24 may include a frame reference of the first frame 48 (frame 9) from which decoding of the encoded video stream 32 of the selected channel received by the end-user rendering device 28 from the content server 26 (FIG. 2) is going to commence from. The processor 58 is typically operative to determine which of the reference frame(s) 63 is required by the end-user rendering device 28 in order to decode the encoded video stream 32 of the selected channel from the middle of the GOP 44 (from the first frame 48 and onward). The determination of which reference frame(s) 63 are required is described in more detail below.

Alternatively, the request 24 may include a request for reference frame(s) 63 based on the end-user rendering device 28 changing channels to the selected channel without a reference to the first frame 48. The request 24 may include a most recently received timestamp in the current (old) channel tuned to before the new channel, e.g.: the most recently received program clock reference (PCR), or the current system clock value, so that the server 30 which is also receiving data for the old channel may find an equivalent time reference in the new channel as described above with reference to FIG. 2. In this case, the processor 58 is typically operative to determine which reference frame(s) 63 are required by the end-user rendering device 28 to decode the GOP 44 based on an estimate of the frames 50 received by the end-user rendering device 28 for the selected channel. The estimation can typically be performed by the processor 58 as the server 30 and the end-user rendering device 28 are both receiving the same content from the content server 26 (FIG. 2) simultaneously.

MPEG-2 uses the temporal reference field of the frame 48 to specify the prediction dependency of frame 48 (forward temporal reference and/or backward temporal reference) to the reference frames 63 being used for prediction. The processor 58 typically parses the temporal reference values of the frame 48 and creates a dependency graph for the frame 48 that the end-user rendering device 28 typically starts decoding from. The reference frame(s) 63 in the dependency graph are typically the ones that need to be re-encoded and sent to the end-user rendering device 28.

In H.264/AVC video, for example, the frame 48 may reference up to 16 reference frames, so there is more work required by the processor 58 to create the dependency graph for the frame 48 in the middle of the GOP 44. It should also be noted that long-term reference frames (defined in the H.264/AVC standard) may also be required in order to start decoding from the middle of the GOP 44.

Alternatively, the request 24 from the end-user rendering device 28 may include a list of which reference frame(s) 63 are required by the end-user rendering device 28 in order to decode the encoded video stream 32 of the selected channel from the middle of the group of pictures 44 based on parsing the temporal reference values of the frame 48 and creating a dependency graph for the frame 48.

Each uncompressed frame 63 is typically a bit map describing all the pixels of that frame. It should be noted that the compressed frames 50 generally only reference uncompressed frames 63 for decoding purposes. Since the uncompressed reference frames 63 being referenced are already uncompressed it is typically irrelevant which compressed reference frame(s) 60 the uncompressed frames 63 originated from for decoding purposes. The above fact may be used to re-encode a non-random access point reference frame 63 (e.g.: frame 6) as a random-access point without reference to any other reference frame 63 as will now be described in more detail.

In the example of FIG. 3, the first frame 48 received by the end-user rendering device 28 is frame 9 which references frame 6. Frames 7, received after frame 9, both reference frames 6 and 9 and so on. Therefore, in order to start decoding from frame 9, only decompressed reference frame 6 is required.

Therefore, when the end-user rendering device 28 requires reference frame(s) for decoding from frame 9 and onwards, only re-encoded frame 6 typically needs be sent to the end-user rendering device 28 as although frame 6 depends on reference frame 3 which depends on reference frame 0 in the original stream 32 sent from the content server 26, the decoded version of frame 6 may be re-encoded as a random access point without reference to frame 3 or frame 0, as will now be described below.

The processor 58 is typically operative to instruct the encoder 54 to encode the reference frame(s) 63 required by the end-user rendering device 28 (FIG. 2) to decode the GOP 44 from the first frame 48 received by the end-user rendering device 28 from the content server 26 (FIG. 2).

The encoder 54 is typically operative to encode the decoded reference frame 63 required by the end-user rendering device 28 to decode the GOP 44 from the first frame 48 and onward (e.g.: frame 6) yielding the re-encoded reference frame 42 so that decoding the re-encoded reference frame 42 (e.g.: frame 6) is not dependent upon any other reference frame 63 (e.g.: frame 0 or frame 3) in the GOP 44.

Therefore, in the encoded video stream 32 received from the content server 26, the reference frame 60 from which reference frame 42 originated is a not a random access point, but the re-encoded reference frame 42 is a random access point.

The transmitter 56 is typically operative to transmit a GOP header followed by the re-encoded reference frame 42 to the end-user rendering device 28 so that the end-user rendering device 28 can start decoding the encoded video stream 32 for the selected channel from the middle of the group of pictures 44.

The content delivery system 22 is not limited to MPEG-2 and H.264/AVC implementations, but may be implemented using any suitable encoding method, for example, but not limited to, VC-1, VP8, Snow and Theora.

Figure 4:
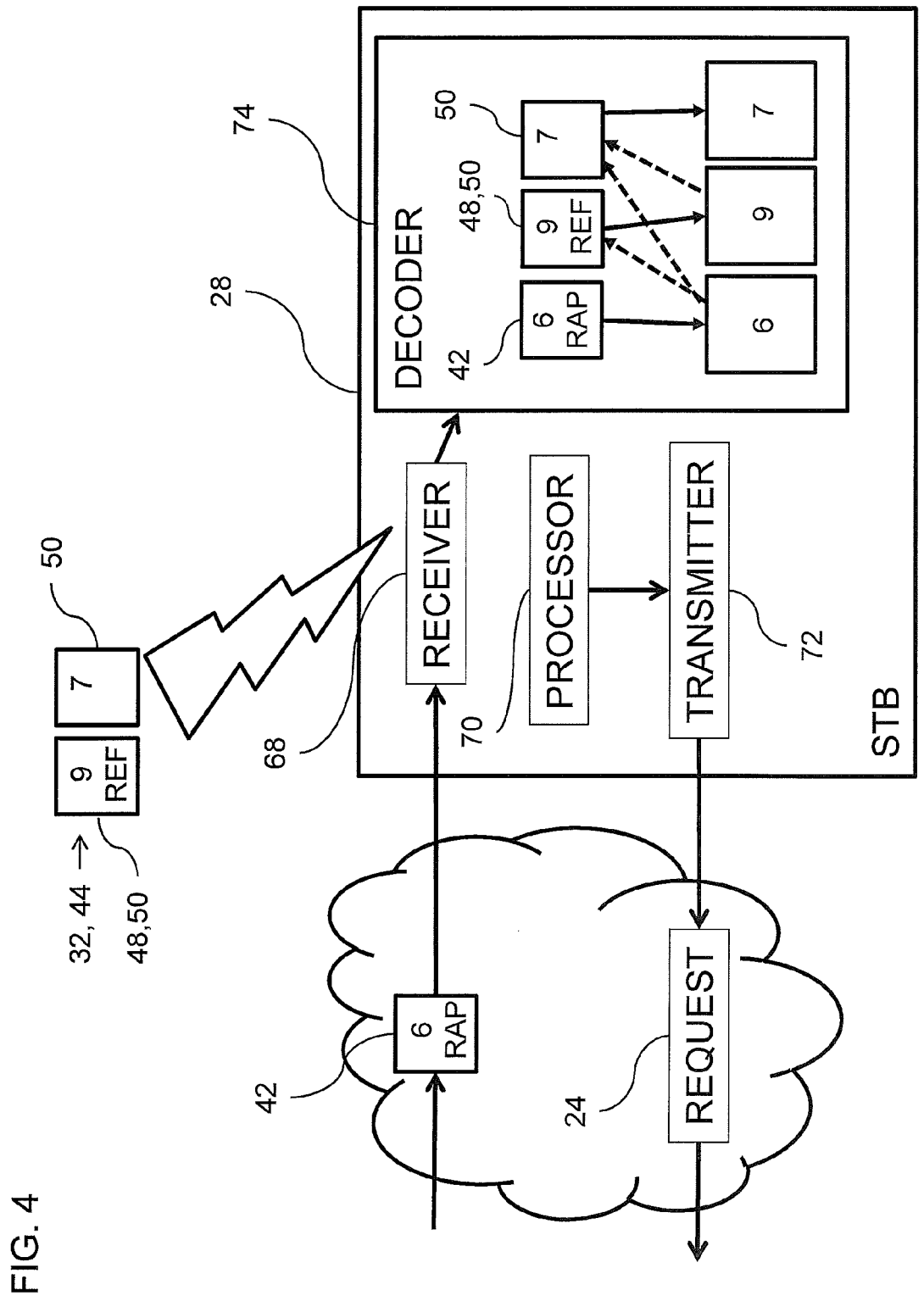
FIG. 4 is a partly pictorial, partly block diagram view of a rendering device in the system of FIG. 2 processing the first channel change operation.

Reference is now made to FIG. 4, which is a partly pictorial, partly block diagram view of the end-user rendering device 28 in the system 22 of FIG. 2 processing the first channel change operation.

The end-user rendering device 28 typically includes a receiver 68, a processor 70, a transmitter 72 and a decoder 74.

The receiver 68 is typically operative to receive the encoded video stream 32 from the content server 26 (FIG. 2) for the selected channel starting from the frame 48 in the middle of the GOP 44. The frames 50 prior to the first frame 48 in the GOP 44 were not received by the end-user rendering device 28.

After the viewer (not shown) selects the selected channel, the processor 70 typically prepares the request 24. The timing of the preparation of the request 24 will generally depend on whether the request 24 will include information about the first frame 48, and if so, the processor 70 typically has to wait until the first frame 48 is received so that the first frame 48 may be identified in the request 24.

In accordance with one embodiment of the present invention, the processor 70 is typically operative to prepare the request 24 to include a frame reference of the first frame 48 from which decoding of the encoded video stream 32 of the selected channel is going to commence.

Alternatively or additionally, the processor 70 is typically operative to prepare the request 24 to include a list of which reference frame or frames are required by the end-user rendering device 28 in order to decode the encoded video stream 32 of the selected channel from the middle of the group of pictures 44.

The transmitter 72 is typically operative to send the request 24 to the server 30 (FIG. 3).

The receiver 68 is generally operative to receive the re-encoded reference frame 42 from the server 30.

The decoder 74 is typically operative to decode the re-encoded reference frame 42 (frame 6 encoded as a random access point) and then start decoding the encoded video stream 32 (reference frame 9 and then frame 7 and so on) for the selected channel from the middle of the group of pictures 44.

Setting the presentation time stamp (PTS) of the new encoded frame 42 is now discussed. The encoder 54 (FIG. 3) of the server 30 (FIG. 3) is typically operative to set the PTS of the new encoded frame 42 to be equal to the PTS of the frame 60 (frame 6) that the reference frame 42 originated from in the GOP 44. One option of setting the clock of the decoder 74 is that the clock is driven by the program clock references in the stream 32 so that the end-user rendering device 28 generally decodes frames 42 and 48 but does not display them since the PTS of each frame 42, 48 may be in the past relative to the current PCR. This may result in a somewhat slower channel change since the end-user rendering device 28 is decoding frames that are not being displayed and only display frames with PTSs that are current with respect to the clock. If the PTS of the frame 42 is smaller (older) than the current PCR, a second option for setting the clock is to set the clock to the PTS of the frame 42 and have the clock increment at the rate of the received PCR (but not be set to the value of the PCR). In this case, the first frame to be displayed will be the frame 42.

Some encoding standards, for example, the MPEG-2 specification, require that the first picture to be displayed after a GOP header has its temporal_reference field set to zero. In MPEG-2, for example, the temporal reference is then incremented by 1 modulo 1024 for each subsequent frame (in display order) in the GOP.

When a GOP is reconstructed as described in FIGS. 2-4, the MPEG-2 guidelines regarding temporal_reference are not adhered to. For example in FIG. 4, the first frame to be decoded in the GOP has its temporal_reference set to 6 instead of zero.

There are two possible approaches to overcome this problem.

The first approach includes adding new functions to the decoder 74 of the end-user rendering device 28. The first stage is for the server 30 to inform the decoder 74 that it will be supplied with reference frame(s) having specific temporal references, e.g. one I frame with temporal_reference of 6. The second stage is for the server 30 to instruct the decoder to start decoding the rest of the stream from frame No. 9 and onwards, with regard to the reference frames from the previous stage.

The other approach to overcome this problem is described in more detail with reference to FIGS. 5 and 6 below.

Figure 5:
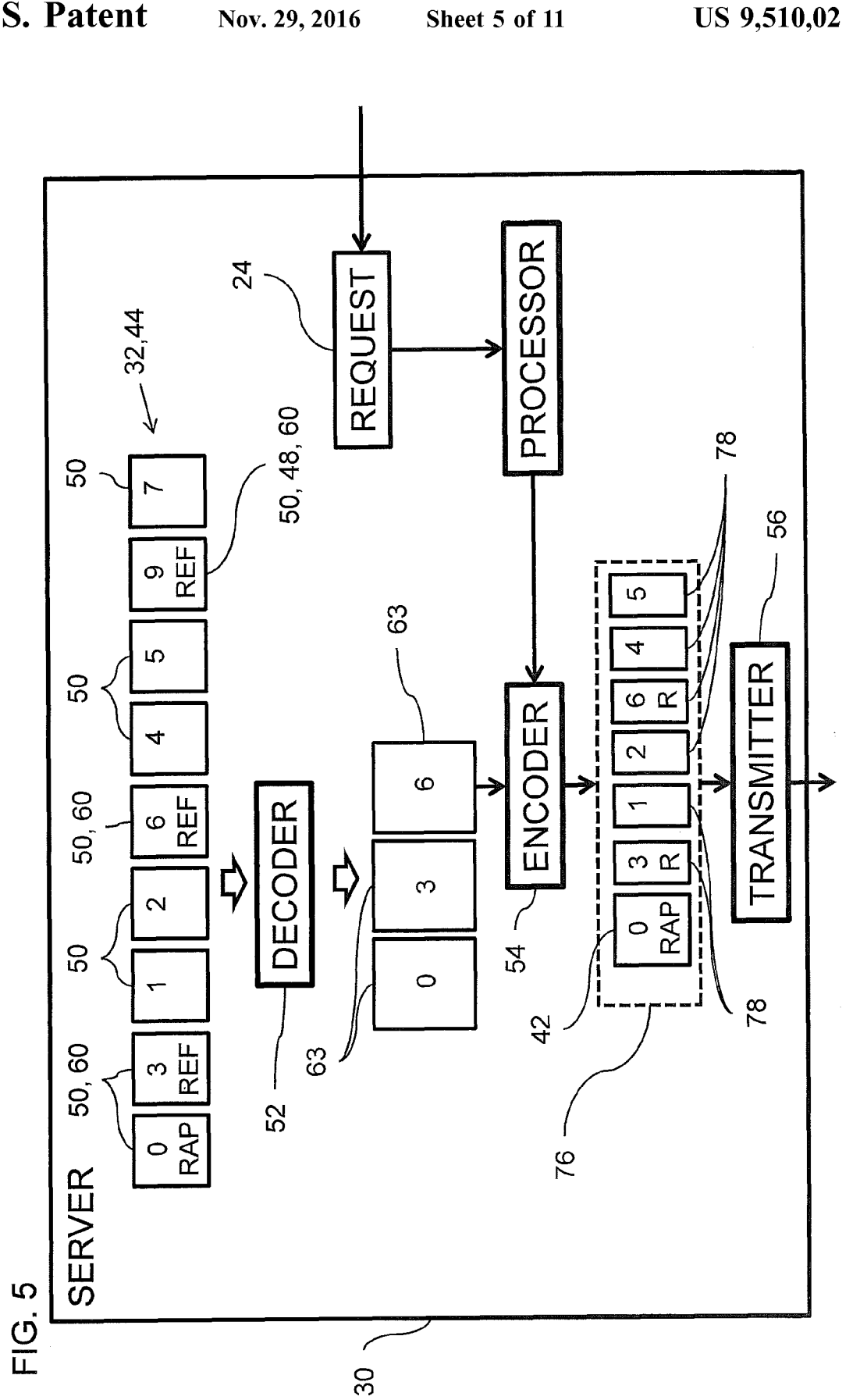
FIG. 5 is a partly pictorial, partly block diagram view of the server of FIG. 3 processing the request in accordance with an alternative method.

Reference is now made to FIG. 5, which is a partly pictorial, partly block diagram view of the server 30 of FIG. 3 processing the request 24 in accordance with an alternative method.

The second approach to overcoming the temporal_reference requirement of MPEG-2 typically involves generating all the missing frames of the GOP 44 as a video sequence 76 (a video sequence of seven frames with temporal_references from zero to six in the example of FIG. 5), but only the frames required for reference (the reference frame 42) for decoding purposes have to include video data, other frames 78 need not include any video data or may just to include data which indicates that the picture of the "empty" frame 78 is the same as the previous frame 78 according to display/temporal order.

FIG. 5 shows that the frame 6 decoded by the decoder 52 has been re-encoded by the encoder 54 as a random access point frame with temporal reference zero (labeled as the reference frame 42) in the video sequence 76. The video sequence 76 also includes the "narrow" frames 78 that do not have to include any video data. The frames 78 are included in the video sequence 76 in order to keep the structure of the GOP 44 according to the MPEG-2 specification. This approach does not typically require any changes to the decoder 74 of FIG. 4, as the decoder 74 receives video which complies with the MPEG-2 standard.

Therefore, the encoder 54 is typically operative to provide the new video sequence 76 including the frames 78 and the re-encoded reference frame 42 (previously frame 6). It will be appreciated that the video sequence 76 typically excludes unnecessary video data from the stream 32 such as the video data of frames 0 and 3 (whether encoded or decoded). The encoder 54 generally provides the video frames 42, 78 of the video sequence 76 with a plurality of temporal references so that: a different temporal reference is provided for each of the video frames 42, 78 of the video sequence 76; and the temporal references of the video frames 42, 78 in the new video sequence 76 plus the temporal references of the video frames 50 (the first frame 48 and onward in decode order) of the group of pictures 44 of the encoded video stream 32 of the selected channel received by the end-user rendering device 28 (FIG. 4) cover all the integers from zero to x, inclusive of zero and x, where x is the largest temporal reference of the temporal references of the video frames 50 in the group of pictures 44. In other words, all the temporal references of the GOP 44 are typically included by the combination of temporal references of the video sequence 76 and the temporal references of the video frames 50 of the GOP 44 received by the end-user rendering device 28 from the content server 26. Additionally, the encoder 54 is typically operative to provide the new video sequence 76 such that the "narrow" video frames 78 in the new video sequence 76 include no new video data.

In the example of FIG. 5, decompressed reference-frame 6 was re-encoded as random access point frame 0. However, it will be appreciated that decompressed reference-frame 6 could be re-encoded as frame 3 or frame 6 in the video sequence 76 or any other suitable frame of the video sequence 76.

The transmitter 56 is typically operative to transmit the video sequence 76 to the end-user rendering device 28 (FIG. 6) so that the end-user rendering device 28 can start decoding the encoded video stream 32 for the selected channel from the middle of the group of pictures 44 (from the first frame 48). It will be appreciated that the bandwidth requirement of transmitting one of the "narrow" frames 78 is typically less than transmitting any of the other video frames 50.

Figure 6:
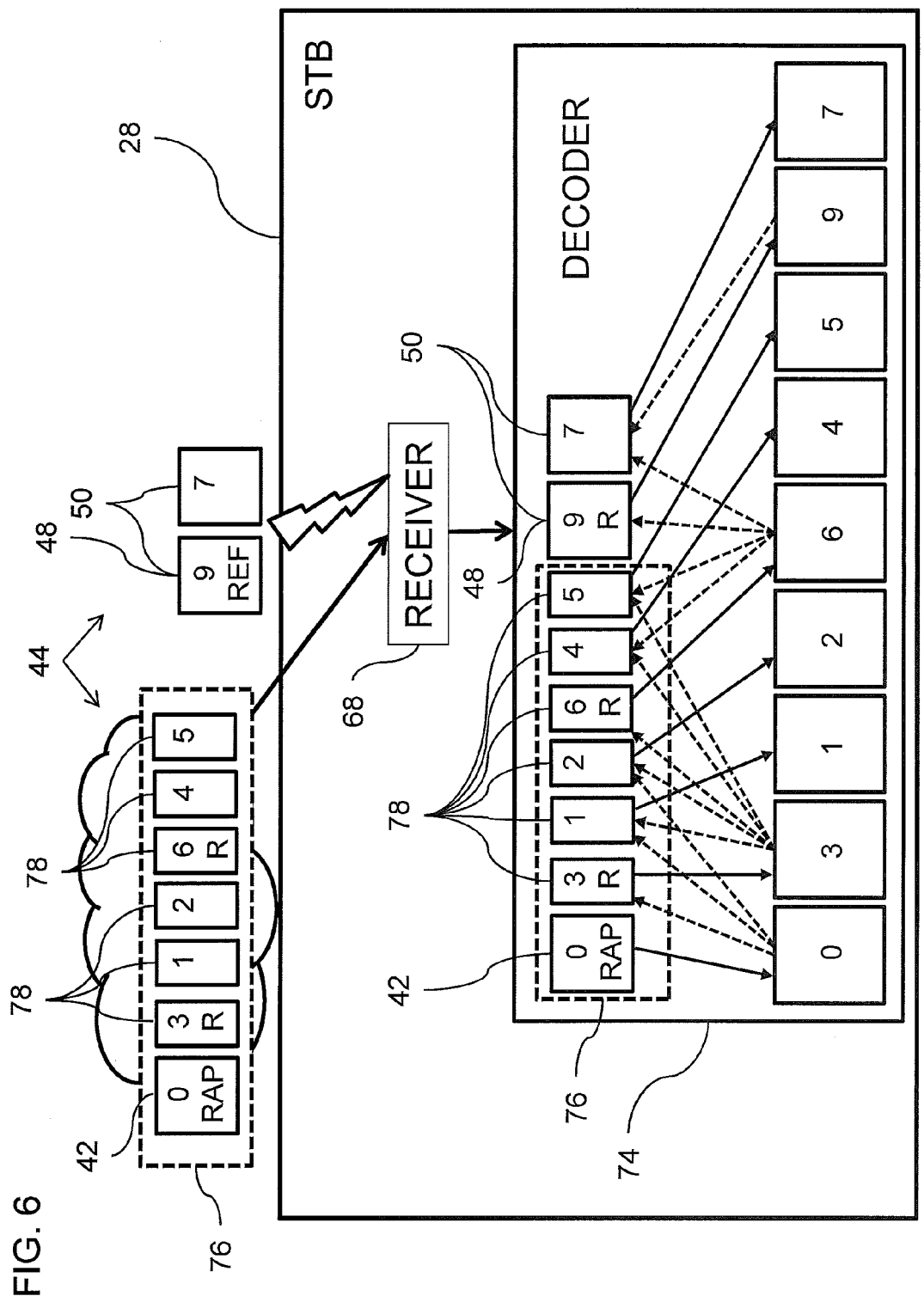
FIG. 6 is a partly pictorial, partly block diagram view of the rendering device of FIG. 4 processing the first channel change operation in accordance with an alternative method.

Reference is now made to FIG. 6, which is a partly pictorial, partly block diagram view of the end-user rendering device 28 of FIG. 4 processing the first channel change operation in accordance with an alternative method.

The receiver 68 is typically operative to receive the video sequence 76 from the server 30 of FIG. 5 and the rest of the GOP 44 starting from the first frame 48 from the content server 26 (FIG. 2).

The video sequence 76 includes the reference frame 42 with temporal reference zero followed by the "narrow" frames 78 with temporal references from 1 to 6. Therefore, the decoder 74 can be provided with all the frames 42, 78, 50 of the GOP 44 without any temporal reference continuity problems.

The decoder 74 is typically operative to decode the video sequence 76 (with temporal references 0 to 6) and then continue with decoding the part of the GOP 44 received from the content server 26 (FIG. 2).

The dotted arrows show the decoding dependency of the frames 42, 78, 50. The reconstructed GOP 44 comprised of the video sequence 76 received from the server 30 and the frames 50 received from the content server 26 (FIG. 2) together typically maintains the same reference frame dependency structure (i.e. which frames are dependent on which reference frames) as if the whole GOP 44 in its entirety had been received from the content server 26.

Adding the "narrow" frames 78 to the video sequence 76 generally does not add much decoding time to the process as once the reference frame 42 has been decoded, the "narrow" frames 78 are decoded very quickly as the decompressed picture of each frame 78 generally includes no new video data.

Setting the presentation time stamp (PTS) of the frames 78 and the reference frame 42 is now discussed. The PTS of the new encoded frame 42 is typically set to be the PTS of the first frame in the GOP 44. The PTS of each of the "narrow" frames 78 is typically set to be the PTS of the original frame 50 that each of the frames 78 is replacing. One option of setting the clock of the decoder 74 is that the clock is driven by the program clock references in the stream 32 so that in general the end-user rendering device 28 decodes frames 42, 48, 78 but does not display them since the PTS of each frame 42, 48, 78 may be in the past relative to the current PCR. This may result in a somewhat slower channel change since the end-user rendering device 28 is decoding frames that are not being displayed and only display frames with PTSs that are current with respect to the clock. If the PTS of the last frame 78 (with the highest temporal reference of the frames 78) is smaller (older) than the current PCR, a second option for setting the clock is to set the clock to the PTS of that frame 78 and have the clock increment at the rate of the received PCR (but not be set to the value of the PCR). In this case, the first frame to be displayed will be that frame 78.

Figure 7:
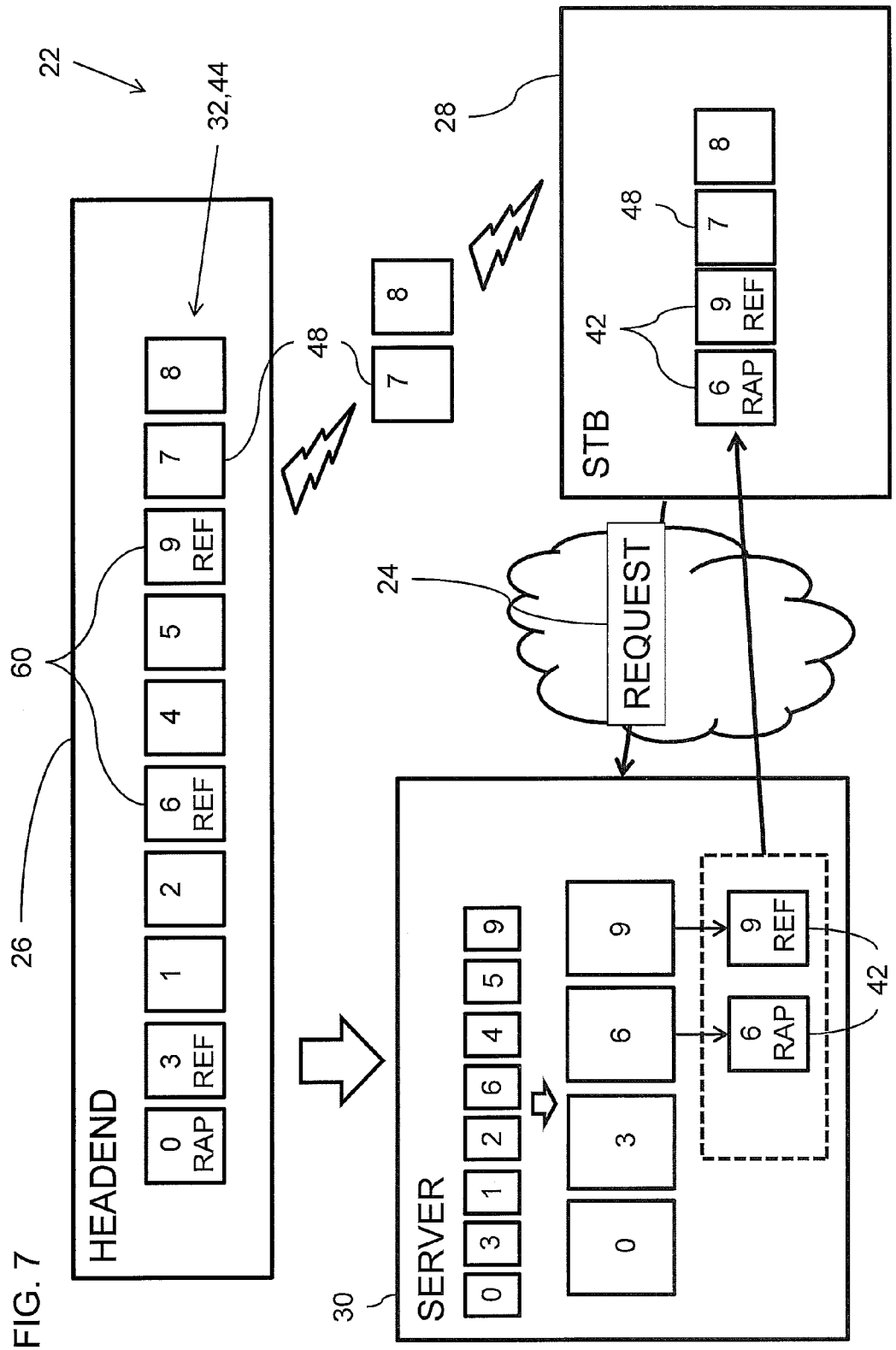
FIG. 7 is a partly pictorial, partly block diagram view of the content delivery system of FIG. 2 processing a request related to a second channel change operation.

Reference is now made to FIG. 7, which is a partly pictorial, partly block diagram view of the content delivery system 22 of FIG. 2 processing the request 24 related to a second channel change operation.

The first channel change operation described with reference to FIGS. 2-6 described the situation whereby one reference frame 42 was required by the end-user rendering device 28 in order to start rendering the GOP 44 from the first frame 48 received by the end-user rendering device 28 in the stream 32 from the content server 26. In certain situations more than one reference frame 42 may be required by the end-user rendering device 28 as part of decoding the encoded video stream 32 of the selected channel from the middle of the GOP 44. For example, in an MPEG-2 environment, if the first frame 48 received (frame 7) is a B-frame which depends on reference frame 6 and reference frame 9 (see FIG. 1 for a more detailed explanation), then the server 30 will have to send reference frame 6 and reference frame 9 to the end-user rendering device 28. In an H.264/AVC environment the end-user rendering device 28 may require one or more, and up to 16, reference frames 42 in order to start rendering the GOP 44 from the first frame 48. The server 30 may optionally determine a more suitable start point for the end-user rendering device 28 to start decoding the GOP 44 based on a reduced number of reference frames 42 required to decode the GOP 44 from that more suitable point as compared to the point requested by the end-user rendering device 28. For example, if the requested start point would require 16 reference frames 42 and the more suitable start point would require less than 16 reference frames, for example, but not limited to, 10 reference frames 42, and the more suitable start point has a presentation time which is only t seconds, for example, but not limited to, 0.5 seconds, after the presentation time of the requested start point then the more suitable start point may be selected by the server 30 as the actual start point. Optionally, the server 30 then informs the end-user rendering device 28 of the actual start point as well as sending the necessary reference frames 42 for decoding the GOP 44 from the actual start point.

Figure 8:
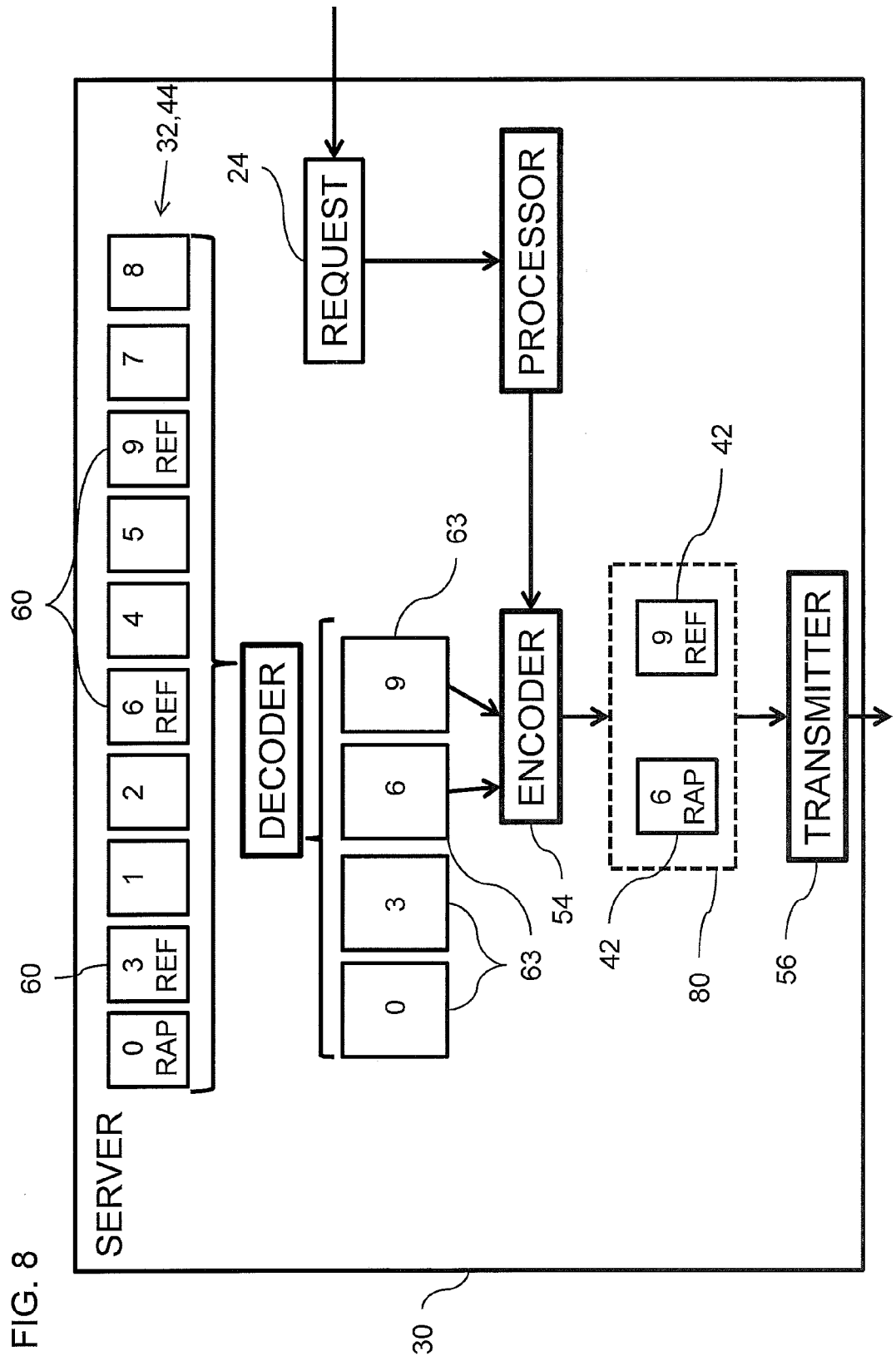
FIG. 8 is a partly pictorial, partly block diagram view of the server of FIG. 3 processing the request related to the second channel change operation.

Reference is now made to FIG. 8, which is a partly pictorial, partly block diagram view of the server 30 of FIG. 3 processing the request 24 related to the second channel change operation.

The reference frames 42 (frame 6 and frame 9) are typically encoded as a video sequence 80 with a first one of the frames 42 (frame 6) being encoded as a random access point and a second one of the frames 42 (frame 9) being encoded with reference to the first frame 42 (frame 6). Alternatively, the second frame 42 (frame 9) could also be encoded as a random access point frame without reference to the first frame 42.

The encoder 54 is typically operative to encode the relevant decoded reference frames 60 (frame 6 and frame 9) yielding the video sequence 80 which includes the re-encoded reference frames 42 (frame 6 and frame 9). The video sequence 80 is generally encoded so that: the video sequence 80 does not include the reference frame 63 (frame 3) which frame 6 depends upon for decoding purposes in the stream 32 received from the content server 26 (FIG. 7); and decoding the video sequence 80 is not dependent upon the reference frame 63 (frame 0) which frame 3 depends upon for decoding purposes in the stream 32 received from the content server 26.

The transmitter 56 is typically operative to transmit the video sequence 80 to the end-user rendering device 28 (FIG. 7) so that the end-user rendering device 28 can start decoding the encoding video stream 32 for the selected channel from the middle of the group of pictures 44.

Figure 9:
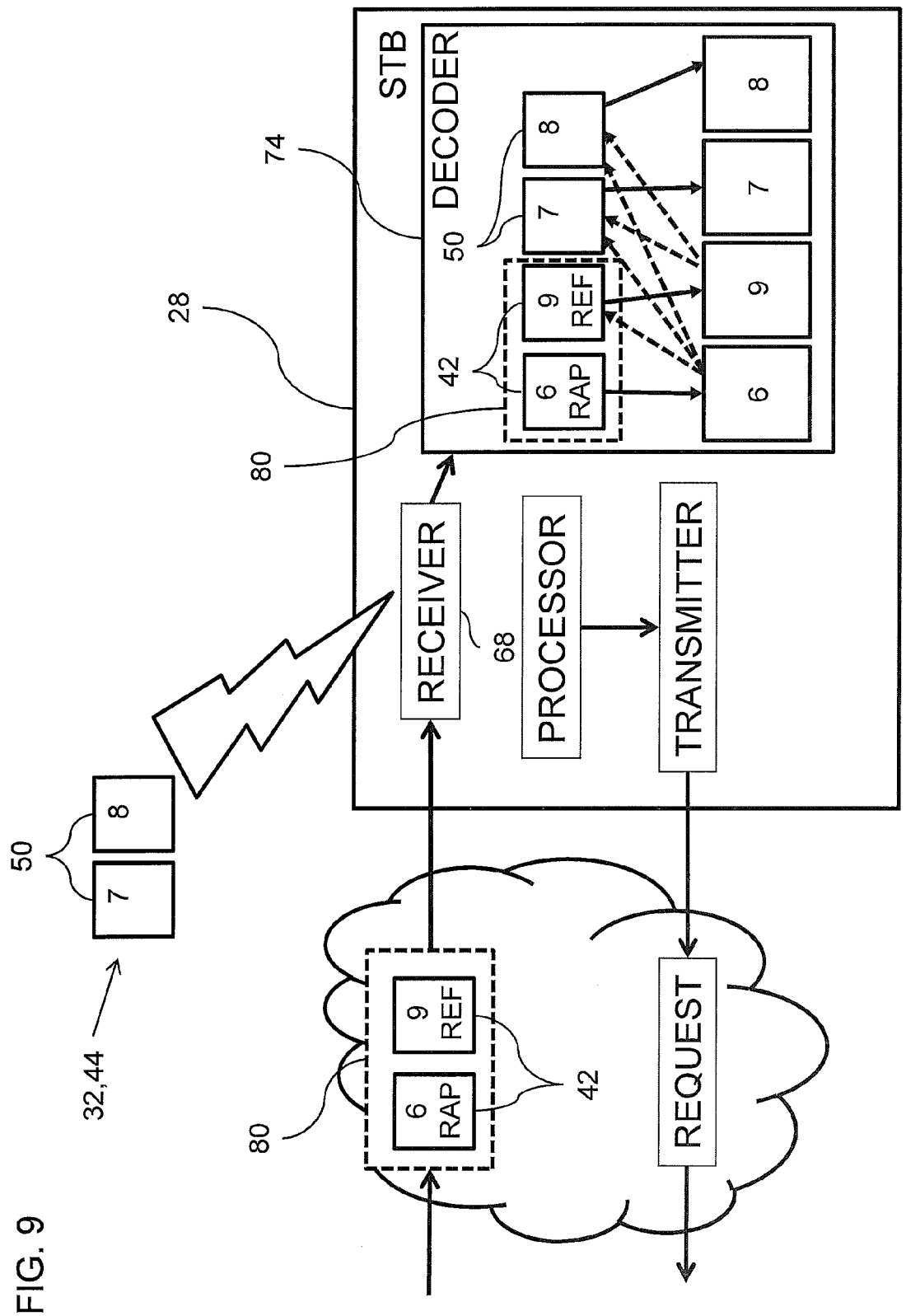
FIG. 9 is partly pictorial, partly block diagram view of the rendering device of FIG. 4 processing the second channel change operation.

Reference is now made to FIG. 9, which is partly pictorial, partly block diagram view of the rendering device 28 of FIG. 4 processing the second channel change operation.

The end-user rendering device 28 has received the frames 50 (frame 7 and frame 8 and onward) of the stream 32 from the content server 26 (FIG. 7). The decoder 74 requires the reference frames 42 as part of decoding the encoded video stream 32 of the selected channel from the middle of the group of pictures 44.

The receiver 68 is typically operative to receive the encoded video sequence 80 including the re-encoded reference frames 42 (frame 6 and frame 9).

Figure 10:
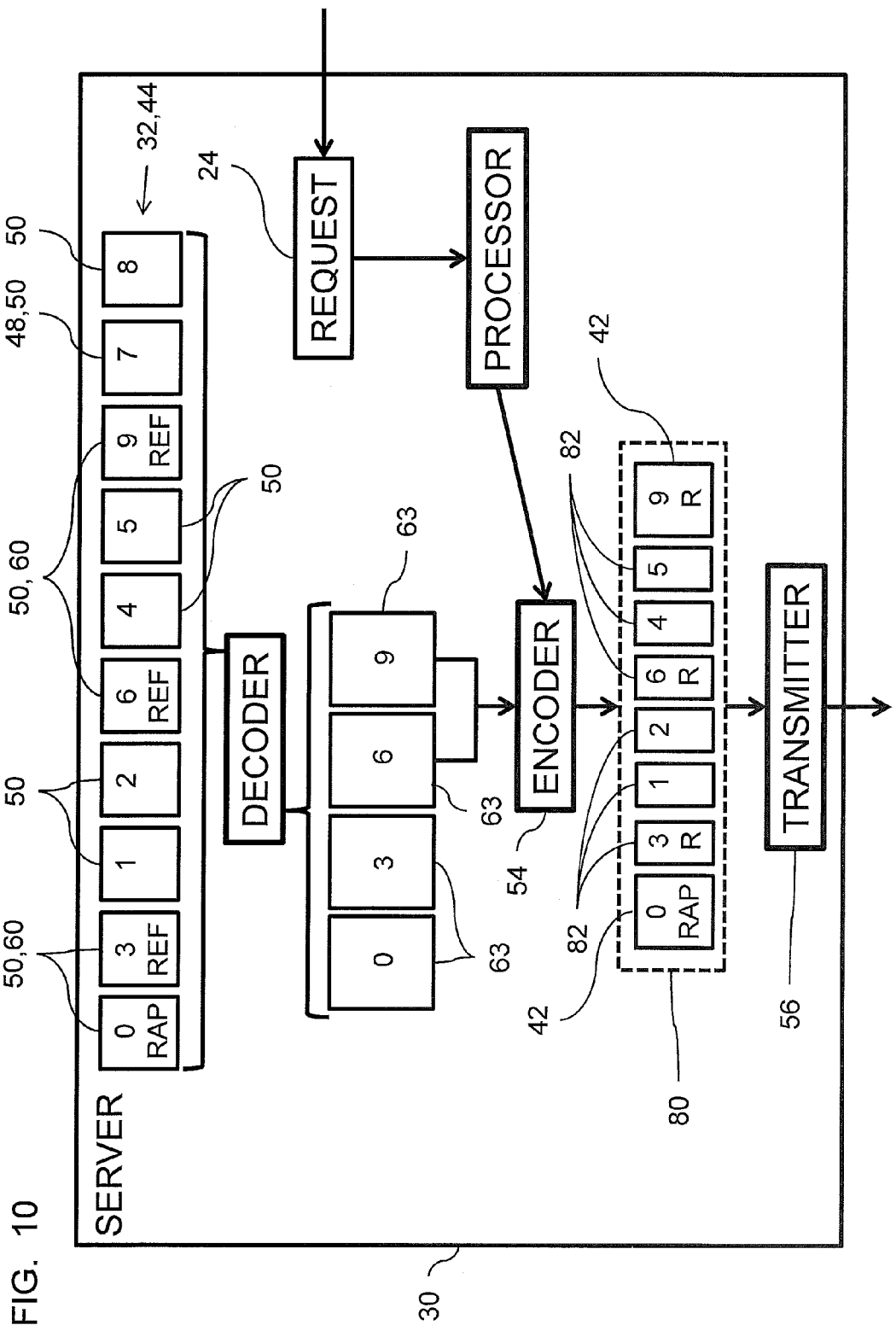
FIG. 10 is a partly pictorial, partly block diagram view of the server of FIG. 8 processing the request related to the second channel change operation in accordance with an alternative method.

It will be appreciated that the video sequence 80 does not comply with the MPEG-2 regarding continuity of temporal references as described in detail with reference to FIGS. 4 and 5. FIG. 10 describes how the server 30 of FIG. 8 may be configured such that the video sequence 80 is compatible with the MPEG-2 standard regarding the continuity of temporal references.

Reference is now made to FIG. 10, which is a partly pictorial, partly block diagram view of the server 30 of FIG. 8 processing the request 24 related to the second channel change operation in accordance with an alternative method.

FIG. 10 shows the server 30 preparing the video sequence 80 to include the reference frames 42 and a plurality of "narrow" frames 82. The first reference frame 42 in the video sequence 80 is a random access point corresponding to reference frame 6 in the stream 32 for the selected channel received from the content server 26. The second reference frame 42 in the video sequence 80 corresponds to reference frame 9 in the stream 32 for the selected channel received from the content server 26. The "narrow frames" 82 do not have to include any video data or just to include data which indicates that the picture of the "empty" frame is the same as the previous frame according to display/temporal order. The frames 82 are included in the video sequence 80 in order to keep the structure of the GOP 44 according to the MPEG-2 specification as described in more detail with reference to FIG. 5. This approach does not require any changes to the decoder 74 of FIG. 11, as the decoder 74 receives video which complies with the MPEG-2 standard regarding the continuity of temporal references.

It will be appreciated that the reference frame 6 from the stream 32 may be re-encoded as any of frames 0, 1, 2, 3 and 6 in the video sequence 80. Similarly, reference frame 9 from the stream 32 may be re-encoded as any of frames 4, 5 and 9 in the video sequence 80.

The encoder 54 is typically operative to provide the video sequence 80 including the video frames 82, 42 such that the new video sequence 80 includes the re-encoded reference frames 42. It will be appreciated that the video sequence 76 typically excludes unnecessary video data from the stream 32 such as the video data of frames 0 and 3 (whether encoded or decoded). Additionally, the encoder 54 is typically operative to provide the video frames 82, 42 of the new video sequence 80 to include temporal references so that: a different temporal reference is provided for each of the video frames 42, 82 of the new video sequence 80; and the temporal references of the video frames 42, 82 in the new video sequence 80 plus the temporal references of the video frames 50 (the first frame 48 and onward in decode order) of the group of pictures 44 of the encoded video stream 32 of the selected channel received by the end-user rendering device 30 (FIG. 11) from the content server 26 cover all the integers from zero to x, inclusive of zero and x, where x is the largest temporal reference of the temporal references of the video frames 50 in the group of pictures 44.

Additionally, the encoder 54 is typically operative to provide the new video sequence 80 such that the narrow video frames 82 in the new video sequence 80 include no new video data.

The transmitter 56 is typically operative to transmit the video sequence 80 to the end-user rendering device 28 (FIG. 11) so that the end-user rendering device 28 can start decoding the encoded video stream 32 for the selected channel from the middle of the group of pictures 44.

Reference is now made to FIG. 11, which is a partly pictorial, partly block diagram view of the rendering device 28 of FIG. 9 processing the second channel change operation in accordance with an alternative method.

The receiver 68 is typically operative to receive the video sequence 80 from the server 30 of FIG. 10 and the rest of the GOP 44 starting from the first frame 48 from the content server 26 (FIG. 7). Therefore, the decoder 74 can be provided with all the frames 42, 82, 50 of the GOP 44 without any breaks in the temporal references of the frames 42, 82, 50.

The decoder 74 is typically operative to decode the video sequence 80 and then continue with decoding the rest of the GOP 44 received from the content server 26 (FIG. 7).

The dashed arrows show the decoding dependency of the frames 42, 82, 50. The reconstructed GOP 44 comprised of the video sequence 80 received from the server 30 and the frames 50 received from the content server 26 (FIG. 7) typically maintains the same reference frame dependency structure as if the whole GOP 44 in its entirety had only been received from the content server 26.

As described above, the content delivery system 22 is typically implemented to enhance channel change speed. However, it will be appreciated that the content delivery system 22 may also be implemented to enable decoding and rendering from the middle of a GOP in other circumstances for example, but not limited to, when end-user rendering device 28 is powered up and the default channel is first received by the end-user rendering device 28 mid-GOP or the end-user rendering device 28 is in the midst of decoding a GOP and then some of the frames 50 of the same GOP are missing or received with an error (for example), the end-user rendering device 28 may then request from the server that some or all of the missing frames be provided or one or more relevant reference frames be provided in order to continue decoding from somewhere in the middle of the same GOP.

In practice, some or all of the above functions may be combined in a single physical component or, alternatively, implemented using multiple physical components. The physical components may comprise hard-wired or programmable devices, or a combination of the two. In some embodiments, at least some of the functions of the processing circuitry may be carried out by a programmable processor under the control of suitable software. This software may be downloaded in electronic form, over a network, for example. Alternatively or additionally, the software may be stored in tangible, non-transitory computer-readable storage media, such as optical, magnetic, or electronic memory.

It is appreciated that software components of the present invention may, if desired, be implemented in ROM (read only memory) form. The software components may, generally, be implemented in hardware, if desired, using conventional techniques. It is further appreciated that the software components may be instantiated, for example, as a computer program product; on a tangible medium; or as a signal interpretable by an appropriate computer.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A server comprising:
    a decoder to:
        receive an encoded video stream for a first channel, the encoded video stream including a plurality of video frames including a plurality of reference frames and a plurality of non-reference frames; and
        decode the reference frames of the received encoded video stream for the first channel yielding the reference frames in decoded format;
    a processor to receive a request from an end-user rendering device external to the server, the end-user rendering device requiring a first one of the reference frames as part of decoding the encoded video stream of the first channel from the middle of a group of pictures of the encoded video stream of the first channel, wherein a second one of the reference frames is a reference frame for the first reference frame in the received encoded video stream;
    an encoder to encode the decoded first reference frame yielding a re-encoded first reference frame so that decoding the re-encoded first reference frame is not dependent upon the second reference frame; and
    a transmitter to transmit the re-encoded first reference frame to the end-user rendering device so that the end-user rendering device can start decoding the encoded video stream for the first channel from the middle of the group of pictures, wherein:
    the video frames of the group of pictures of the encoded video stream of the first channel include a plurality of first temporal references starting at zero and incrementing by one such that each of the video frames of the group of pictures has a different one of the first temporal references;
    the encoder is operative to provide a new video sequence including a plurality of video frames such that:
        the new video sequence includes the re-encoded first reference frame but excludes the second reference frame; and
        the video frames of the new video sequence include a plurality of second temporal references so that: a different one of the second temporal references is provided for each of the video frames of the new video sequence; and the second temporal references of the video frames in the new video sequence plus the first temporal references of the video frames of the group of pictures of the encoded video stream of the first channel received by the end-user rendering device cover all the integers from zero to x, inclusive of zero and x, where x is the largest temporal reference of the first temporal references of the video frames in the group of pictures; and
    the transmitter is operative to transmit the new video sequence to the end-user rendering device so that the end-user rendering device can start decoding the encoded video stream for the first channel from the middle of the group of pictures.

2. The server according to claim 1, wherein:
the end-user rendering device requires the first reference frame and a third one of the reference frames as part of decoding the encoded video stream of the first channel from the middle of the group of pictures; and
the encoder is operative to encode the decoded first reference frame and the decoded third reference frame in the new encoded video sequence which includes the re-encoded first reference frame and a re-encoded third reference frame, the new video sequence being encoded so that decoding the new video sequence is not dependent upon the second reference frame.

3. The server according to claim 2, wherein the encoder is operative to encode the decoded first reference frame and the decoded third reference frame so that in the new encoded video sequence, the first reference frame is a reference frame for the third reference frame.

4. The server according to claim 1, wherein:
in the received encoded video stream, the first reference frame is not a random access point; and
the re-encoded first reference frame is a random access point.

5. The server according to claim 1, wherein the processor is operative to determine which of the reference frames is required by the end-user rendering device in order to decode the encoded video stream of the first channel from the middle of the group of pictures.

6. The server according to claim 5, wherein the request from the end-user rendering device includes a frame reference of a frame from which decoding of the encoded video stream of the first channel received by the end-user rendering device is going to commence.

7. The server according to claim 5, wherein the request from the end-user rendering device includes a most recently received timestamp in the channel tuned to before the first channel or a current system clock value.

8. The server according to claim 1, wherein the request from the end-user rendering device includes a list of which one or ones of the reference frames are required by the end-user rendering device in order to decode the encoded video stream of the first channel from the middle of the group of pictures.

9. The server according to claim 1, wherein the encoder is operative to provide the new video sequence such that at least two of the video frames in the new video sequence include no new video data.

10. The server according to claim 1, wherein the request relates to the end-user rendering device changing channels to the first channel in the middle of a group of pictures of the encoded video stream of the first channel.

11. A method performed in a server comprising:
receiving an encoded video stream for a first channel, the encoded video stream including a plurality of video frames including a plurality of reference frames and a plurality of non-reference frames;
decoding the reference frames of the encoded video stream for the first channel yielding the reference frames in decoded format;
receiving a request from an end-user rendering device which is external to the server, the end-user rendering device requiring a first one of the reference frames as part of decoding the encoded video stream of the first channel from the middle of a group of pictures of the encoded video stream of the first channel, wherein a second one of the reference frames is a reference frame for the first reference frame in the received encoded video stream;
encoding the decoded first reference frame yielding a re-encoded first reference frame so that decoding the re-encoded first reference frame is not dependent upon the second reference frame; and
transmitting the re-encoded first reference frame to the end-user rendering device so that the end-user rendering device can start decoding the encoding video stream for the first channel from the middle of the group of pictures, wherein:
the video frames of the group of pictures of the encoded video stream of the first channel include a plurality of first temporal references starting at zero and incrementing by one such that each of the video frames of the group of pictures has a different one of the first temporal references;
the encoding including providing a new video sequence including a plurality of video frames such that:
the new video sequence includes the re-encoded first reference frame but excludes the second reference frame; and
the video frames of the new video sequence include a plurality of second temporal references so that: a different one of the second temporal references is provided for each of the video frames of the new video sequence; and the second temporal references of the video frames in the new video sequence plus the first temporal references of the video frames of the group of pictures of the encoded video stream of the first channel received by the end-user rendering device cover all the integers from zero to x, inclusive of zero and x, where x is the largest temporal reference of the first temporal references of the video frames in the group of pictures; and
the transmitting includes transmitting the new video sequence to the end-user rendering device so that the end-user rendering device can start decoding the encoded video stream for the first channel from the middle of the group of pictures.

12. The method according to claim 11, wherein the first reference frame and a third one of the reference frames is required as part of decoding the encoded video stream of the first channel from the middle of the group of pictures, and further comprising encoding the decoded first reference frame and the decoded third reference frame in the new encoded video sequence which includes the re-encoded first reference frame and a re-encoded third reference frame, the new video sequence being encoded so that decoding the new video sequence is not dependent upon the second reference frame.

13. The method according to claim 12, wherein encoding the decoded first reference frame and the decoded third reference frame is performed so that in the new encoded video sequence, the first reference frame is a reference frame for the third reference frame.

14. The method according to claim 11, wherein:
in the received encoded video stream, the first reference frame is not a random access point; and
the re-encoded first reference frame is a random access point.

15. The method according to claim 11, further comprising determining which of the reference frames is required by the end-user rendering device in order to decode the encoded video stream of the first channel from the middle of the group of pictures.

16. The method according to claim 15, wherein the request from the end-user rendering device includes a frame reference of a frame from which decoding of the encoded video stream of the first channel received by the end-user rendering device is going to commence.

17. The method according to claim 15, wherein the request from the end-user rendering device includes a most recently received timestamp in the channel tuned to before the first channel or a current system clock value.

18. The method according to claim 11, wherein the request from the end-user rendering device includes a list of which one or ones of the reference frames are required by the end-user rendering device in order to decode the encoded video stream of the first channel from the middle of the group of pictures.

19. The method according to claim 11, further comprising providing the new video sequence such that at least two of the video frames in the new video sequence include no new video data.

20. The method according to claim 11, wherein the request relates to the end-user rendering device changing channels to the first channel in the middle of a group of pictures of the encoded video stream of the first channel.

* * * * *